April 15, 1958     J. L. BRYANT     2,830,564
ROTARY VALVE
Filed April 27, 1954
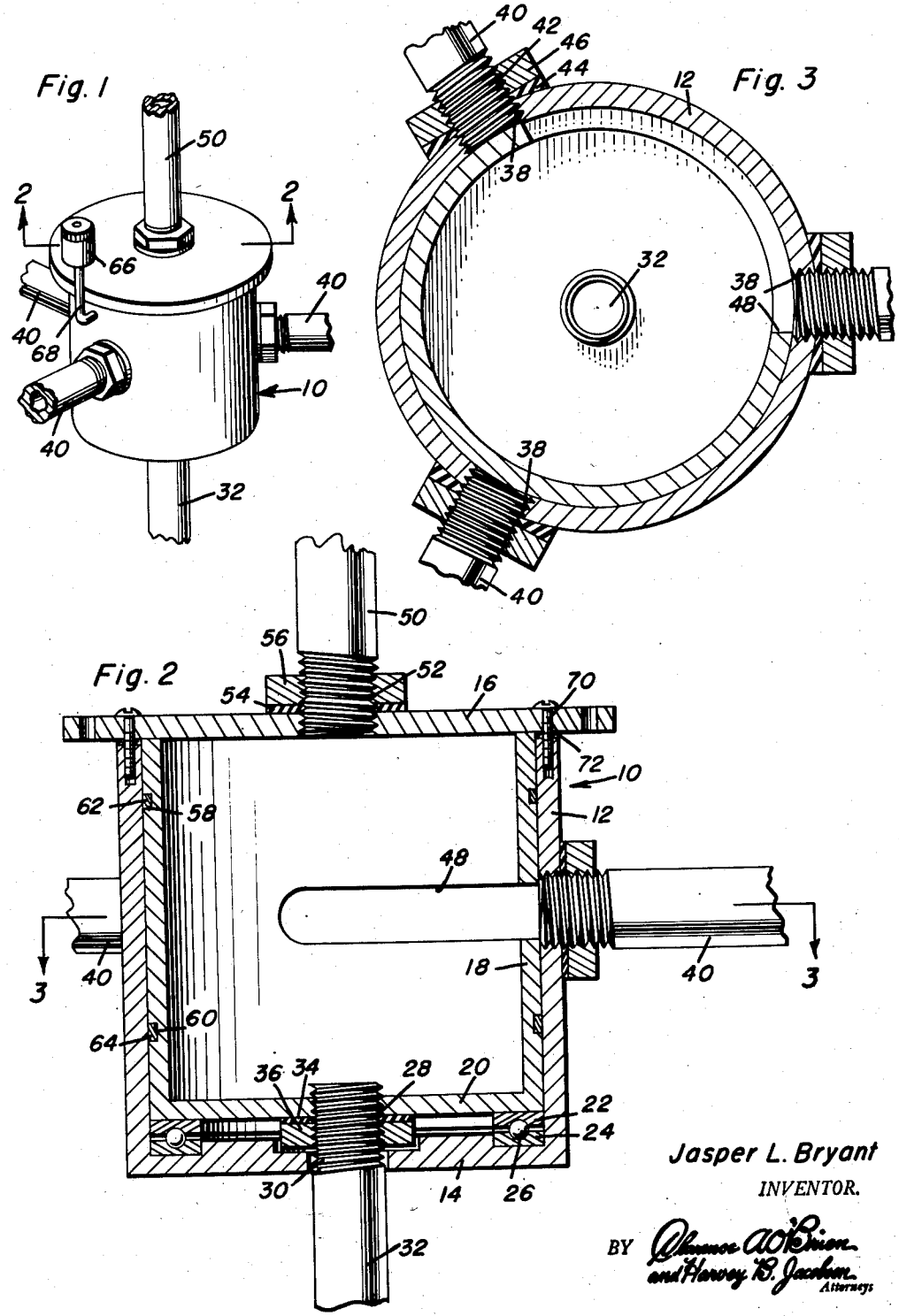
Jasper L. Bryant
INVENTOR.

United States Patent Office 2,830,564
Patented Apr. 15, 1958

2,830,564

ROTARY VALVE

Jasper L. Bryant, Greensboro, N. C.

Application April 27, 1954, Serial No. 425,817

1 Claim. (Cl. 121—187)

This invention relates generally to valving mechanisms and pertains more particularly to an improved rotary valve assembly particularly adapted for use in conjunction with a piston type motor.

A primary object of this invention is to provide an improved rotary valve mechanism of simplified and compact construction and which consists of a minimum number of moving parts for most effectively supplying fluid under pressure in properly timed relation to a plurality of operating cylinders having reciprocating pistons therein which are connected to a common output shaft.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the improved rotary valve;

Figure 2 is a vertical section taken through the rotary valve generally along the plane of section line 2—2 in Figure 1; and Figure 3 is a horizontal section taken substantially along the plane of section line 3—3 in Figure 2.

Referring more particularly to the drawings, the rotary valve will be seen to consist essentially of a casing indicated generally by the reference character 10 which incorporates a cylindrical wall portion 12, a bottom wall 14 and a removable top member 16. Disposed within this casing is a generally cup-shaped valve member having a cylindrical wall portion 18 disposed in closely spaced relation to the inner surface of the side wall 12 of the casing and having a bottom 20 disposed in spaced relation to the bottom wall 14 of the casing and mounted for rotation thereon by means of a bearing assembly including the upper and lower races 22 and 24 having ball bearings 26 therebetween.

Centrally disposed in the bottom 20 is a threaded aperture 28 into which the threaded end portion 30 of a drive shaft member 32 is received. For the purpose of securely locking the drive shaft to the valve member, a suitable washer 34 and lock nut 36 may be provided, in the manner shown most clearly in Figure 2. The rotary valve assembly is intended to be mounted upon the motor with which it is associated much in the same manner as ignition distributors are conventionally mounted, that is, with the casing rigidly secured by any suitable means to the body of the motor, and the valve drive shaft 32 connected by suitable gear means to the crankshaft of the motor.

The casing 10 is provided with a plurality of threaded apertures 38 in circumferentially spaced relation in the side wall 12, these openings being equally spaced, in the manner shown most clearly in Figure 3. Each opening has an inlet conduit 40 associated therewith, such that the threaded end portions 42 of the inlet conduits are threadedly engaged within the openings, the securement being completed by the washer members 44 and lock nuts 46, in the manner shown. To cooperate with these inlet conduits, the valve member is provided with an elongated, circumferentially extending slot 48 which, as will be seen in Figure 3, is of such length as to completely uncover only one inlet opening at a time, but will permit partial uncovering of two adjacent inlet openings simultaneously.

A supply conduit 50 is attached to the removable cover member 16 by threading its free end 52 within a threaded aperture in the cover member and securing the conduit thereto by means of the lock washer 54 and lock nut 56 such that the conduit communicates with the interior of the casing and valve member assemblies. In this manner, it will be readily apparent that as the drive shaft 32 is rotated, the elongated slot 48 will successively uncover the various inlet conduits 40 which lead to individual cylinders of the piston type motor with which the valve assembly is associated. Although it is preferred that compressed air be utilized as a source of energy, it will be readily apparent that any suitable fluid may be utilized.

To provide a proper seal against escape of the fluid, the valve member is provided with a pair of circumferential grooves 58 and 60 which receive piston ring members 62 and 64 which bear against the inner surface of the casing wall 12. These sealing rings are disposed above and below the elongated slot 48.

To assure an adequate lubrication of the internal parts of the rotary valve, an oil cup member 66 is secured thereto by a tube 68 such that the oil within the cup will flow by gravity between the inner surface of the casing wall 12 and the wall 18 of the valve member to lubricate these parts.

It is to be noted that the cover member 16 is removably positioned on the casing wall 12 by means of fasteners 70 and that gasket or shim means 72 is disposed between the cover and the casing wall 12 such that the proper pressure may be applied between the undersurface of the cover member 16 and the top edge of the wall 18 of the valve member to properly preload the bearing assembly disposed between the bottom of the casing and the bottom of the valve.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A rotary valve comprising a casing having a cylindrical side wall, a bottom wall integral with said side walls, and a removable top member, a hollow cylindrical vave member rotatably received in said casing, said valve member having a cylindrical wall portion concentric to and in closely spaced relation to the side wall of said casing and having a bottom wall spaced from the bottom wall of said casing, bearing means disposed between the bottom wall of said valve member and the bottom wall of said casing, said cylindrical wall portion of the valve member having its upper edge engaged against the undersurface of said top member, a drive shaft projecting through the bottom wall of said casing and secured to the bottom of said valve member, said casing having a plurality of equally spaced openings disposed circumferentially in said side wall, an outlet conduit secured within each of said openings, an inlet conduit secured to said top member and communicating with the interior of said casing, said valve member having a circumferentially elongated slot in its cylindrical wall, said slot being of such dimension as to partially uncover two adjacent openings in said side wall, said side wall portion of the valve member being provided with first and second circumferential grooves disposed above and below, respectively, of said elongated slot, and a sealing ring disposed in each of said grooves bearing against the inner surface of said casing.

References Cited in the file of this patent

UNITED STATES PATENTS

| | | |
|---|---|---|
| 963,470 | Du Pont | July 5, 1910 |
| 1,046,427 | Barney | Dec. 10, 1912 |
| 1,458,644 | Dempsey | June 12, 1923 |
| 2,023,349 | Whittle | Dec. 3, 1935 |
| 2,052,472 | Hyman | Aug. 25, 1936 |
| 2,067,346 | Rovinsky | Jan. 12, 1937 |
| 2,516,388 | Humphreys | July 25, 1950 |
| 2,533,931 | Hartley | Dec. 12, 1950 |
| 2,545,834 | Westbrook | Mar. 20, 1951 |
| 2,594,173 | Jensen | Apr. 22, 1952 |
| 2,747,593 | Royer | May 29, 1956 |

FOREIGN PATENTS

| | | |
|---|---|---|
| 767,548 | France | July 20, 1934 |